(12) United States Patent
Chinthekindi et al.

(10) Patent No.: US 10,592,158 B1
(45) Date of Patent: Mar. 17, 2020

(54) METHOD AND SYSTEM FOR TRANSFERRING DATA TO A TARGET STORAGE SYSTEM USING PERFECT HASH FUNCTIONS

(71) Applicant: EMC IP Holding Company LLC, Hopkinton, MA (US)

(72) Inventors: Ramprasad Chinthekindi, Pune (IN); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/174,497

(22) Filed: Oct. 30, 2018

(51) Int. Cl.
 *G06F 3/06* (2006.01)

(52) U.S. Cl.
 CPC ......... *G06F 3/0647* (2013.01); *G06F 3/0604* (2013.01); *G06F 3/0683* (2013.01)

(58) Field of Classification Search
 None
 See application file for complete search history.

(56) References Cited

U.S. PATENT DOCUMENTS

| | | | | |
|---|---|---|---|---|
| 6,058,392 A * | 5/2000 | Sampson | ............ | G06F 16/2255 |
| 7,792,877 B2 * | 9/2010 | Chellapilla | ......... | G06F 16/9014 |
| | | | | 707/803 |
| 7,965,297 B2 * | 6/2011 | Hoppe | ................ | H04L 67/1065 |
| | | | | 345/564 |
| 8,190,835 B1 | 5/2012 | Yueh | | |
| 8,316,064 B2 * | 11/2012 | Hsu | ..................... | G06F 16/1727 |
| | | | | 707/813 |
| 8,387,003 B2 * | 2/2013 | Darcy | ................. | G06F 16/9014 |
| | | | | 717/106 |
| 8,396,841 B1 | 3/2013 | Janakiraman | | |
| 8,825,667 B2 * | 9/2014 | Hsu | ..................... | G06F 16/1727 |
| | | | | 707/747 |
| 8,898,114 B1 | 11/2014 | Feathergill et al. | | |
| 8,898,120 B1 | 11/2014 | Efstathopoulos | | |
| 8,918,390 B1 | 12/2014 | Shilane et al. | | |
| 8,943,032 B1 * | 1/2015 | Xu | ........................ | G06F 16/119 |
| | | | | 707/698 |
| 8,949,208 B1 * | 2/2015 | Xu | ........................ | G06F 3/0641 |
| | | | | 707/661 |

(Continued)

FOREIGN PATENT DOCUMENTS

| | | |
|---|---|---|
| EP | 2738665 A1 | 6/2014 |
| WO | 2013115822 A1 | 8/2013 |
| WO | 2014185918 A1 | 11/2014 |

OTHER PUBLICATIONS

'Theory and Practice of Bloom Filters for Distributed Systems' by Tarkoma et al., IEEE Communications Surveys & Tutorials, vol. 14, No. 1, First Quarter 2012. (Year: 2012).*

(Continued)

*Primary Examiner* — Steven G Snyder
(74) *Attorney, Agent, or Firm* — Chamberlain, Hrdlicka, White, Williams & Aughtry

(57) ABSTRACT

A method for transferring data includes populating a perfect hash bit vector (PHV) using a perfect hash function (PHF) and a target index file to obtain a populated PHV, determining required segment references using the populated PHV and received segment references, providing the required segment references to a source storage device, and receiving segments corresponding to the required segment references from the source storage device.

14 Claims, 8 Drawing Sheets

(56) References Cited

U.S. PATENT DOCUMENTS

| | | | | |
|---|---|---|---|---|
| 9,317,218 | B1* | 4/2016 | Botelho | G06F 3/0655 |
| 9,367,448 | B1* | 6/2016 | Botelho | G06F 12/0253 |
| 9,405,761 | B1* | 8/2016 | Botelho | G06F 16/1727 |
| 9,424,185 | B1* | 8/2016 | Botelho | G06F 12/0253 |
| 9,430,164 | B1* | 8/2016 | Botelho | G06F 3/0655 |
| 9,455,996 | B2* | 9/2016 | Chao | H04L 63/0245 |
| 9,594,674 | B1* | 3/2017 | Mondal | G06F 12/0269 |
| 9,715,505 | B1* | 7/2017 | Mondal | G06F 16/1727 |
| 9,830,111 | B1 | 11/2017 | Patiejunas et al. | |
| 10,002,048 | B2 | 6/2018 | Chennamsetty et al. | |
| 10,031,672 | B2 | 7/2018 | Wang et al. | |
| 10,108,543 | B1* | 10/2018 | Duggal | G06F 12/0253 |
| 10,108,544 | B1* | 10/2018 | Duggal | G06F 12/0253 |
| 10,146,697 | B1* | 12/2018 | Duggal | G06F 12/0253 |
| 2007/0245119 | A1* | 10/2007 | Hoppe | H04L 67/1065 711/216 |
| 2008/0275847 | A1* | 11/2008 | Chellapilla | G06F 16/9014 |
| 2009/0235115 | A1 | 9/2009 | Butlin et al. | |
| 2010/0049735 | A1* | 2/2010 | Hsu | G06F 16/1727 707/E17.005 |
| 2010/0094817 | A1 | 4/2010 | Ben-Shaul et al. | |
| 2011/0099175 | A1* | 4/2011 | Darcy | G06F 16/9014 707/747 |
| 2011/0099351 | A1 | 4/2011 | Condict | |
| 2011/0196869 | A1 | 8/2011 | Patterson et al. | |
| 2013/0036104 | A1* | 2/2013 | Hsu | G06F 16/1727 707/698 |
| 2013/0086017 | A1* | 4/2013 | Chao | H04L 63/0245 707/698 |
| 2013/0138620 | A1 | 5/2013 | Yakushev et al. | |
| 2014/0258248 | A1 | 9/2014 | Lambright et al. | |
| 2014/0258824 | A1 | 9/2014 | Khosla et al. | |
| 2014/0310476 | A1 | 10/2014 | Kruus et al. | |
| 2015/0106345 | A1 | 4/2015 | Trimble et al. | |

OTHER PUBLICATIONS

'Minimal Perfect Hash Functions' by Damian Gryski, GopherAcademy, Dec. 3, 2017. (Year: 2017).*

'Lecture 10—Universal and Perfect Hashing' by Avrim, cmu.edu, archived from Jun. 1, 2017. (Year: 2017).*

'Hash Sets' by Robert M. Kline, wcupa.edu, archived from Jul. 25, 2017. (Year: 2017).*

'Simple and Space-Efficient Minimal Perfect Hash Functions' by Botelho et al., WADS'07 Proceedings of the 10th international conference on Algorithms and Data Structures, pp. 139-150, Halifax, Canada—Aug. 15-17, 2007. (Year: 2007).*

Deepavali Bhagwat et al.; "Extreme Binning: Scalable, Parallel Deduplication for Chunk-based File Backup"; IEEE Mascots; Sep. 2009 (10 pages).

International Search Report and Written Opinion issued in corresponding PCT Application PCT/US2018/027646, -dated Jul. 27, 2018. (30 pages).

International Search Report and Written Opinion issued in corresponding WO Application No. PCT/US2018/027642, dated Jun. 7, 2018 (15 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

\* cited by examiner

METHOD AND SYSTEM FOR TRANSFERRING DATA TO A TARGET STORAGE SYSTEM USING PERFECT HASH FUNCTIONS

BACKGROUND

Computing device generate and storage large amounts of data. Over time, the data that is stored may be transferred to a remote storage system. Depending on how the data is initially stored by the computing device and the remote storage system, it may be difficult to efficiently transfer the stored data to the remote storage system.

SUMMARY

In one aspect, a method for transferring data in accordance with one or more embodiments of the invention includes populating a perfect hash bit vector (PHV) using a perfect hash function (PHF) and a target index file to obtain a populated PHV, determining required segment references using the populated PHV and received segment references, providing the required segment references to a source storage device, and receiving segments corresponding to the required segment references from the source storage device.

In one aspect, a system in accordance with one or more embodiments of the invention includes a processor and memory comprising a populated perfect hash bit vector (PHV) and instructions, which when executed by the processor perform a method. The method includes populating a perfect hash bit vector (PHV) using a perfect hash function (PHF) and a target index file to obtain a populated PHV, determining required segment references using the populated PHV and received segment references, providing the required segment references to a source storage device, and receiving segments corresponding to the required segment references from the source storage device.

In one aspect, a non-transitory computer readable medium comprising computer readable program code, which when executed by a computer processor enables the computer processor to perform a method. The method includes populating a perfect hash bit vector (PHV) using a perfect hash function (PHF) and a target index file to obtain a populated PHV, determining required segment references using the populated PHV and received segment references, providing the required segment references to a source storage device, and receiving segments corresponding to the required segment references from the source storage device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
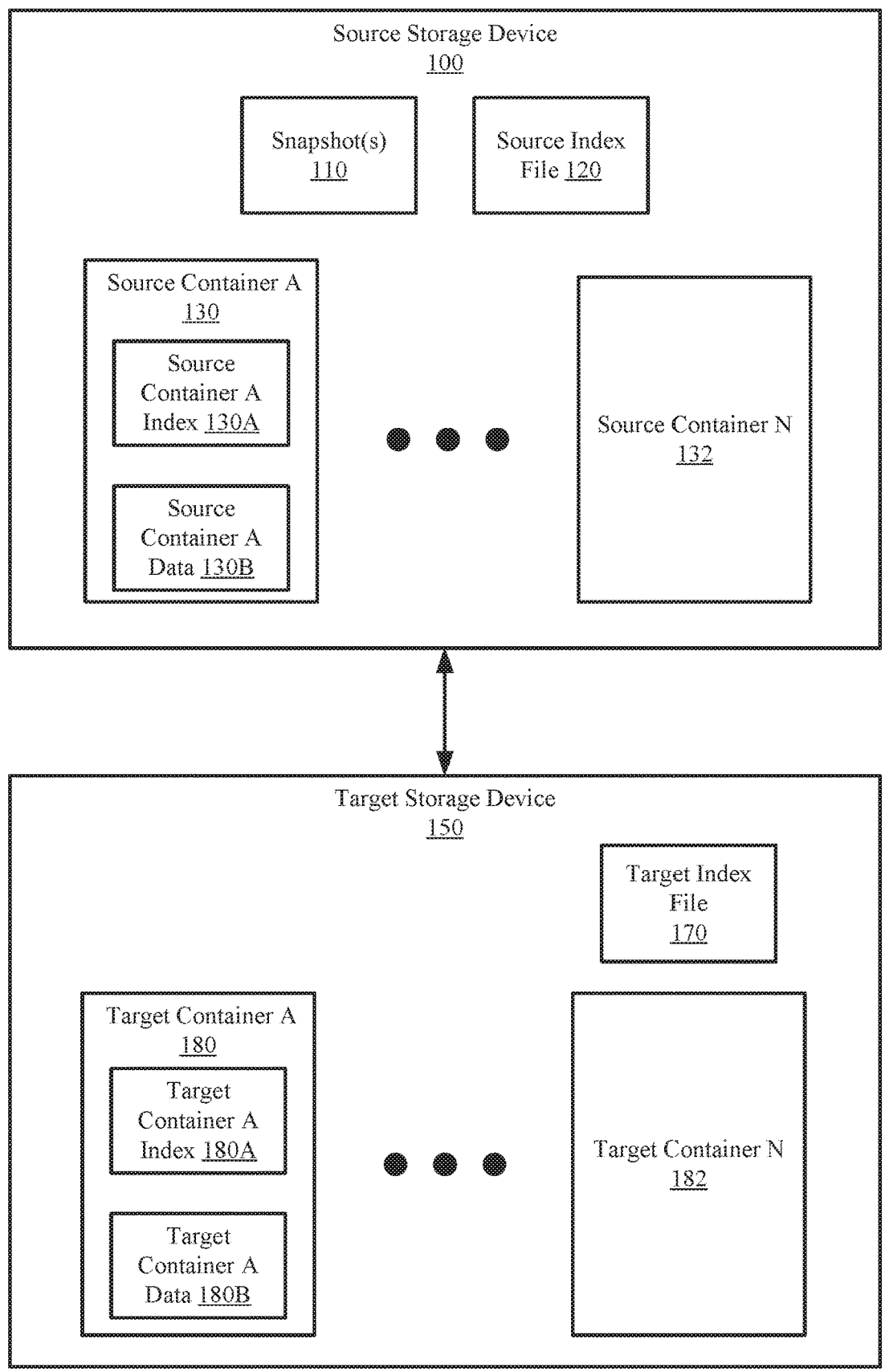
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for sending data from one computing device to another. More specifically, embodiments of the invention relate to generating a perfect hash function (PHF) using a source index file and a target index file and then using the PHF to populate a perfect hash vector (PHV). The PHV may then be used to efficiently determine what data to transfer to a target storage device. By using a PHF and the PHV, embodiments of the invention substantially limit (or eliminate) the number on-disk loop ups that need to be performed on the target storage device in order determine what data needs to be transferred from the source storage device to the target storage device. This results in a decrease in the processing resources required to determine what data to transfer as well as the amount of time required to complete the data transfer from a source storage device to the target storage device.

FIG. 1A shows an example system in accordance with one or more embodiments of the invention. The system includes a source storage device (100) and a target storage device (150). Each component of the system of FIG. 1A may be operably connected via any combination of wired and/or wireless connections. Each component of the system is discussed below.

In one or more embodiments of the invention, the source storage device (100) includes functionality to generate one or more snapshots (110) (defined below), generate one or more source index files (120) (defined below) and to perform all or a portion of the method shown in FIG. 2A in order to transfer files (or portions thereof) to the target storage device.

In one embodiment of the invention, the source storage device may also perform de-duplication on the files prior to them being stored in persistent storage (not shown) on the source storage device. In one or more embodiments of the invention, the persistent storage includes any type of non-volatile storage. Examples of non-volatile storage may include, but are not limited to, magnetic storage, optical storage, solid-state storage (e.g., NAND or NOR Flash memory), any other type of non-volatile memory, and/or any combination thereof.

Continuing with the discussion of FIG. 1A, in one embodiment of the invention, de-duplicating the files, before storing the files in the persistent storage, may increase the amount of files that can be stored in the persistent storage when compared to the amount of files that can be stored in the persistent storage without de-duplicating the files. De-duplicating the files may also decrease the cost associated with storing files in the persistent storage by reducing the total amount of storage required to store the de-duplicated files when compared to the amount of storage required to store the files without being de-duplicated.

As used herein, deduplication refers to methods of storing only portions of files (also referred to as file segments or segments) that are not already stored in the persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one embodiment of the invention, each snapshot (110) corresponds to the state of the files stored in the persistent storage at a given point in time. More specifically, each snapshot (110) includes the segments and references (also referred to as segment references) to the segments that are stored in the source storage device (100) at the time the snapshot is taken. More specifically, because the files are de-duplicated prior to being stored in the persistent storage, each file is stored as a series of segments, where each segment includes data and/or metadata associated with the file. As such, the snapshot includes the segments and the references to the segments corresponding to the files that are stored in the persistent storage. In one embodiment of the invention, a reference to the segment (also referred to as a segment reference or fingerprint) uniquely identifies the segment in the snapshot.

In one embodiment of the invention, the segments may be logically grouped together into containers (130, 132). Each container may include a container index (130A) and container data (130B). The container data (130B) includes certain segments of one or more files and the container index (130A) specifies which segments are in the corresponding container and the location of each segment within the corresponding container.

In one embodiment of the invention, each snapshot (110) may be associated with a source index file (120). The source index file (120) includes a listing of references (e.g., references to segments) in the snapshot and may be generated by enumerating the references that are included in the snapshot. For additional details regarding the source index file (120), see, e.g., FIG. 1B.

Figure 4:
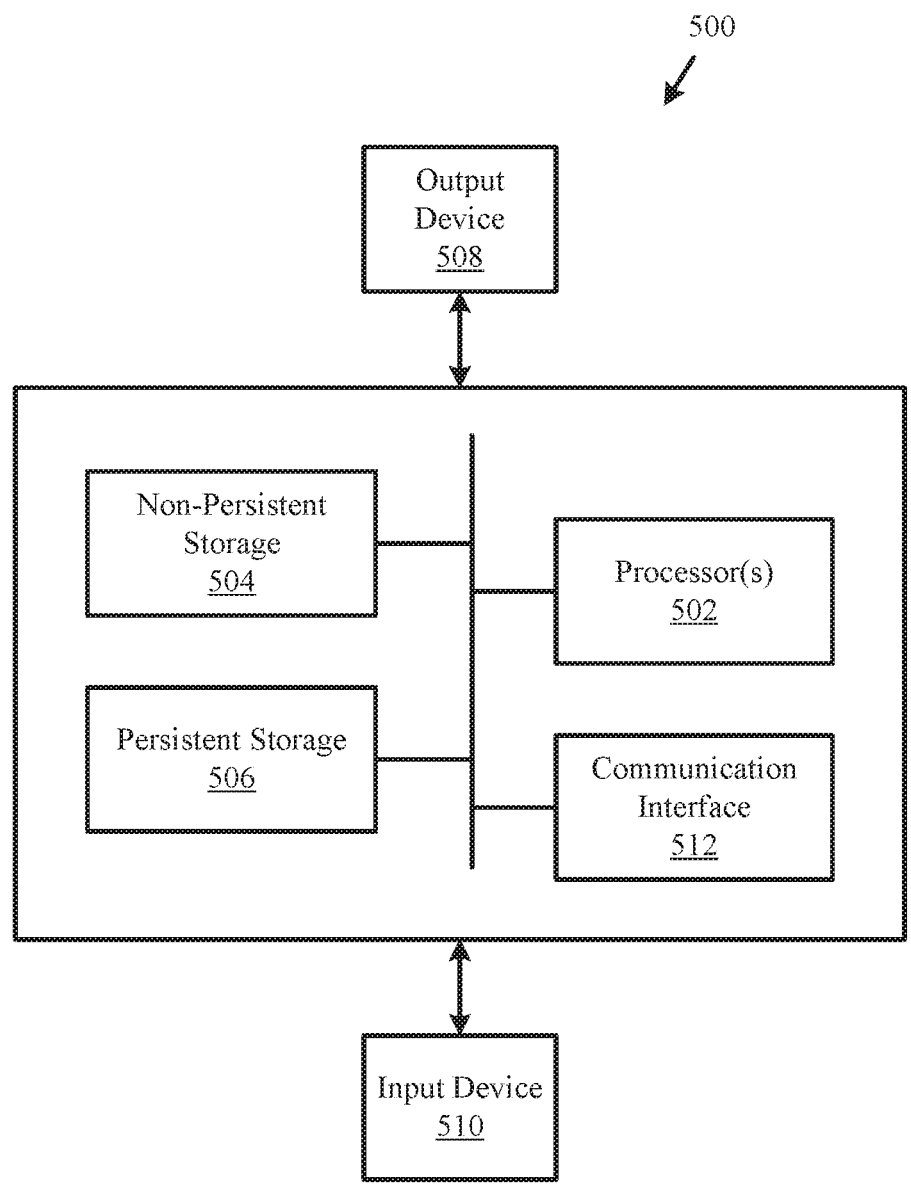
FIG. 4 shows a diagram of a computing device in accordance with one or more embodiments of the invention.

In one or more embodiments of the invention, the source storage device (100) may be a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the source storage device (100) described throughout this application and/or all, or a portion thereof, of the methods illustrated in FIG. 2A.

In one or more embodiments of the invention, the source storage device (100) is implemented as a logical device. The logical device may utilize the computing resources of any number of computing devices and thereby provide the functionality of the source storage device (100) described throughout this application and/or all, or a portion thereof, of the methods illustrated in FIG. 2A.

In one or more embodiments of the invention, the target storage device (150) includes functionality for generate one or more target index files (120) (defined below), generate a perfect hash function (PHF), populate a perfect hash bit vector (PHV) (160) using the PHF, and to perform all or a portion of the methods shown in FIGS. 2B-2C to enable the transfer of files (or portions thereof) to the target storage device from the source storage device.

In one embodiment of the invention, the target storage device may also perform de-duplication on the files prior to them being stored in persistent storage (not shown) on the target storage device. In such scenarios, the target storage device may include the same or substantially similar functionality as the source target device with respect to the de-duplication of files.

In one or more embodiments of the invention, the persistent storage includes any type of non-volatile storage. Examples of non-volatile storage may include, but are not limited to, magnetic storage, optical storage, solid-state storage (e.g., NAND or NOR Flash memory), any other type of non-volatile memory, and/or any combination thereof.

As described with respect to the source storage device, each file that is stored in the target storage device may be stored as a series of segments, where each segment includes data and/or metadata associated with the file. In one embodiment of the invention, the segments may be logically grouped together into containers (180, 182). Each container may include a container index (180A) and container data (180B). The container data (180B) includes certain segments of one or more files and the container index (180A) specifies which segments are in the corresponding container and the location of each segment within the corresponding container.

In one embodiment of the invention, the target storage device includes functionality to generate a target index file (170) that includes a listing of all references (e.g., references to segments) in a snapshot of the target storage device and may be generated by enumerating the references that are included in the snapshot. The snapshot used to generate the target index file (170) may be generated by the target storage device in a manner that is similar or substantially similar to the manner in which the source storage device generates snapshots. The target index file may be generated using other methods without departing from the invention.

In one or more embodiments of the invention, the target storage device (150) may be a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the target storage device (150) described throughout this application and/or all, or a portion thereof, of the methods illustrated in FIGS. 2B-2C.

In one or more embodiments of the invention, the target storage device (150) is implemented as a logical device. The logical device may utilize the computing resources of any number of computing devices and thereby provide the functionality of the target storage device (150) described throughout this application and/or all, or a portion thereof, of the methods illustrated in FIGS. 2B-2C.

While the system of FIG. 1A has been described and illustrated as including a limited number of components for the sake of brevity, a system in accordance with embodiments of the invention may include additional, fewer, and/or different components than those illustrated in FIG. 1A without departing from the invention.

Figure 1B:
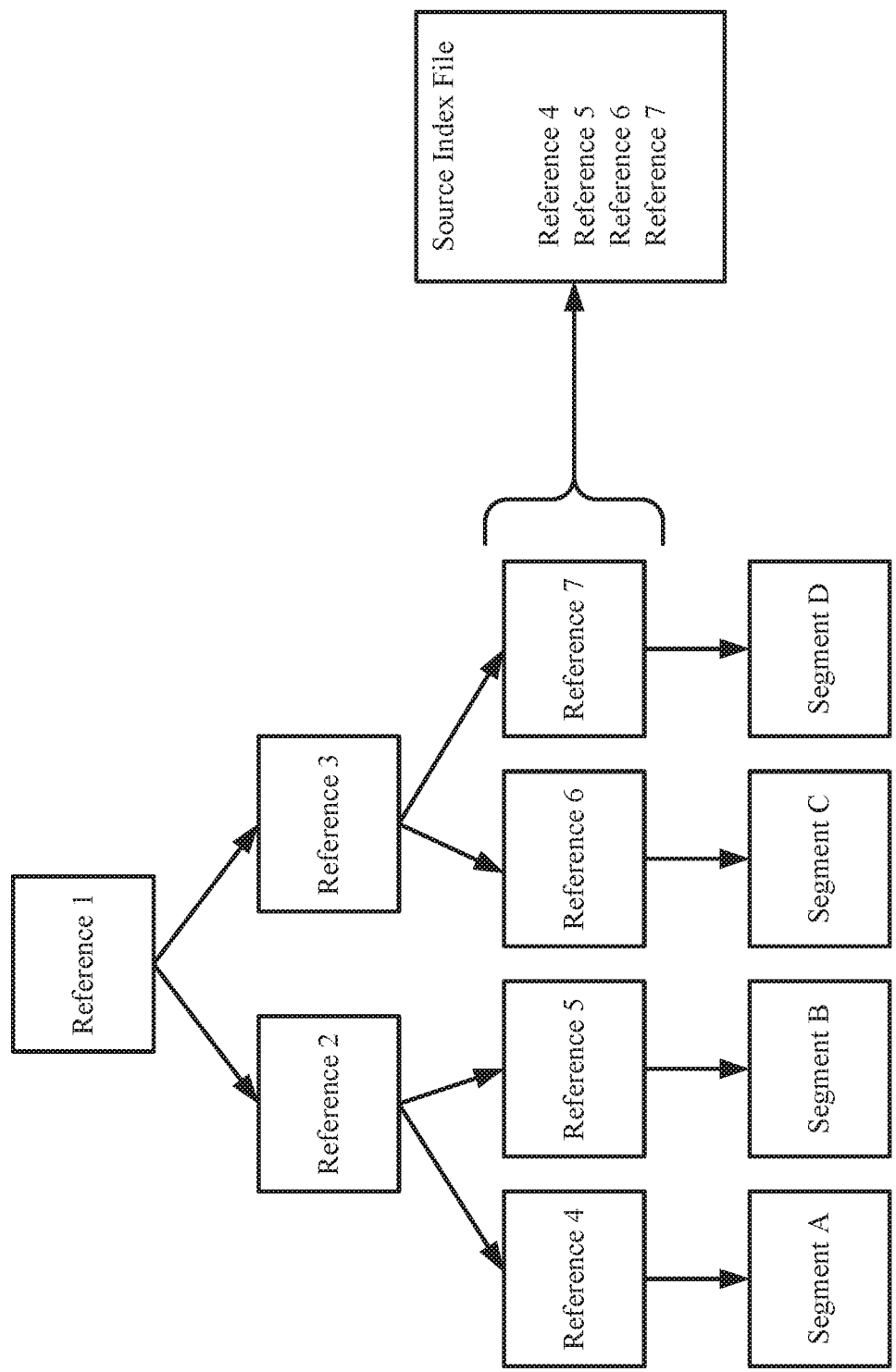
FIG. 1B shows a diagram of a file tree segment in accordance with one or more embodiments of the invention.

To clarify embodiments of the invention, FIG. 1B shows a diagram of a file tree segment in accordance with one or more embodiments of the invention. The file tree segment may include any number of segments (e.g., reference 1, reference 2, reference 3, reference 4, reference 5, reference 6, reference 7). Each reference may specify another reference in associated with the file or may reference a segment of data (i.e., segment A, segment B, segment C, segment D). In one or more embodiments of the invention, a snapshot (e.g., 110, FIG. 1A) may include any number of file segment trees and all references in the file segment tree (e.g., references 1-7). In contrast, the source index file may include the references to segments (e.g., reference 4-7 of the file segment tree).

While the various steps in the following flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

Figure 2A:
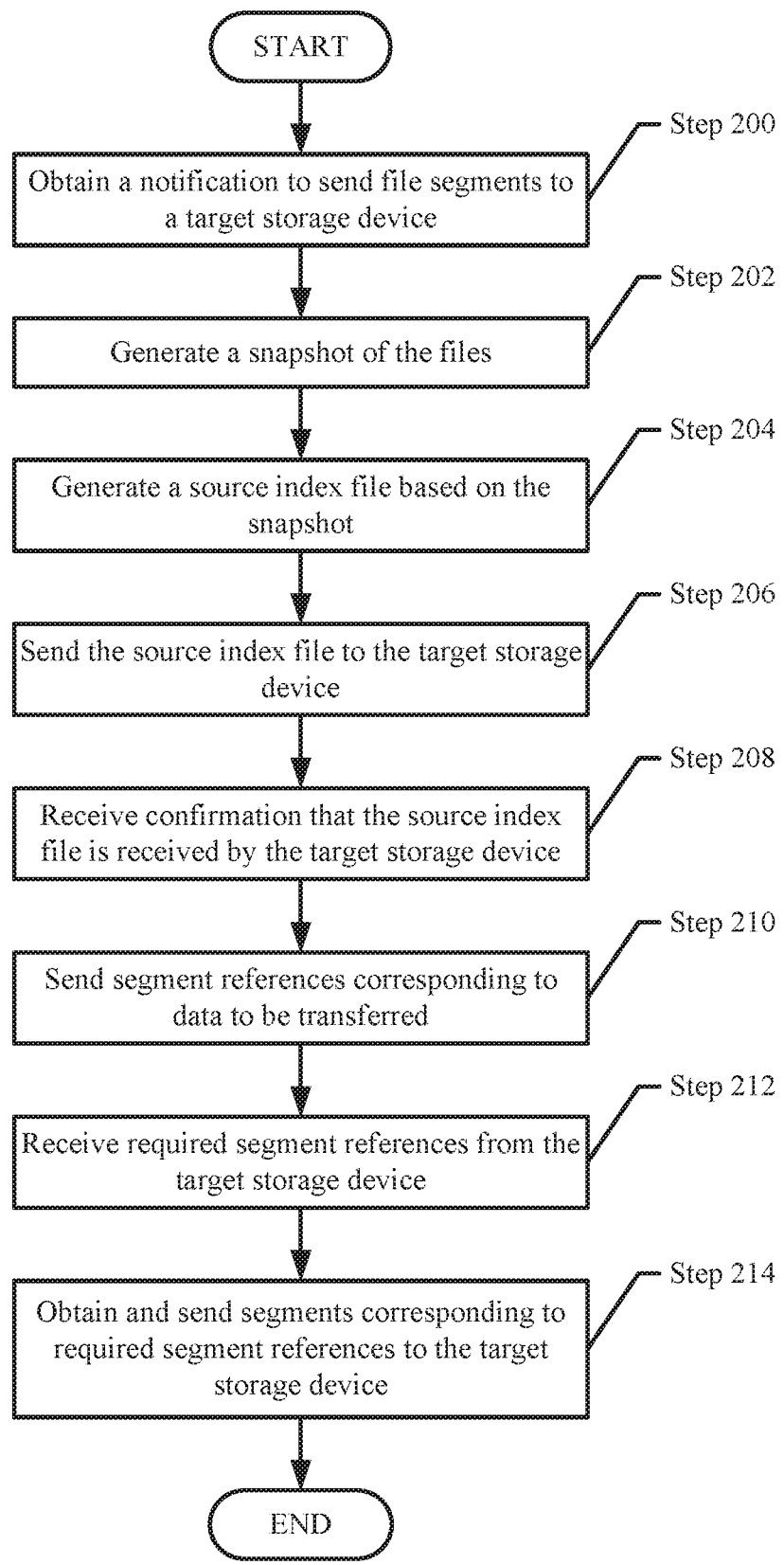
FIG. 2A shows a flowchart for transferring data from a source storage device to a target storage device in accordance with one or more embodiments of the invention.

FIG. 2A shows a flowchart for transferring data from a source storage device to a target storage device in accordance with one or more embodiments of the invention. The method shown in FIG. 2A may be performed by, for example, a source storage device (100, FIG. 1A). Other components of the system illustrated in FIG. 1A may perform the method of FIG. 2A without departing from the invention.

Turning to FIG. 2A, in Step 200, a notification to send files or file segments to a target storage device is obtained. In one or more embodiments of the invention, the notification is issued, for example, by a client (e.g., a computing device operatively connected to the source storage device) (not shown) sending a request to the source storage device for data to be transferred to a target storage device (e.g., cloud storage device). Alternatively, the notification may be issued by a remote agent (e.g., a process executing on the source storage device or another computing device operatively connected to the source storage device) implementing backup policies. The backup policies may specify a time at which data is to be transferred from the source storage device to the target storage device. For example, a remote agent may issue a notification that specifies that file segments generated and stored in the source storage device for more than 30 days from today are to be transferred to the target storage device.

In another embodiment of the invention, the notification may be issued by a process executing on the source storage device.

Continuing with the discussion of FIG. 2A, in Step 202, in response to receiving the notification, a snapshot of the files stored in the source storage device is generated.

In Step 204, a source index file is generated based on the snapshot. The source index file may be generated by identifying the segment references in the snapshot and generating the source index file with the segment references.

In Step 206, the source index file is sent to the target storage device.

In Step 208, the source storage device receives a confirmation from the target storage device that it has received the source index file.

In Step 210, segment references corresponding to files (or portions thereof) that are to be transferred are transferred (or stored) on the target storage device. The segment references may be sent to the target storage device in response to obtaining confirmation of the source index being received.

In Step 212, required segment references are received from the target storage device. The required segment references correspond to the specific segments that will be sent to the target storage. The required segment references may be a portion of the segment references sent in Step 210 that are not already in the target storage device. The required segment references may be obtained from the target storage device after Step 232 of FIG. 2B is performed by the target storage device.

In step 214, the required segments (i.e., the segments that are identified by the required segment references) are obtained from the source storage device (e.g., from the persistent storage on the source storage device) and transferred to the target storage device.

Figure 2B:
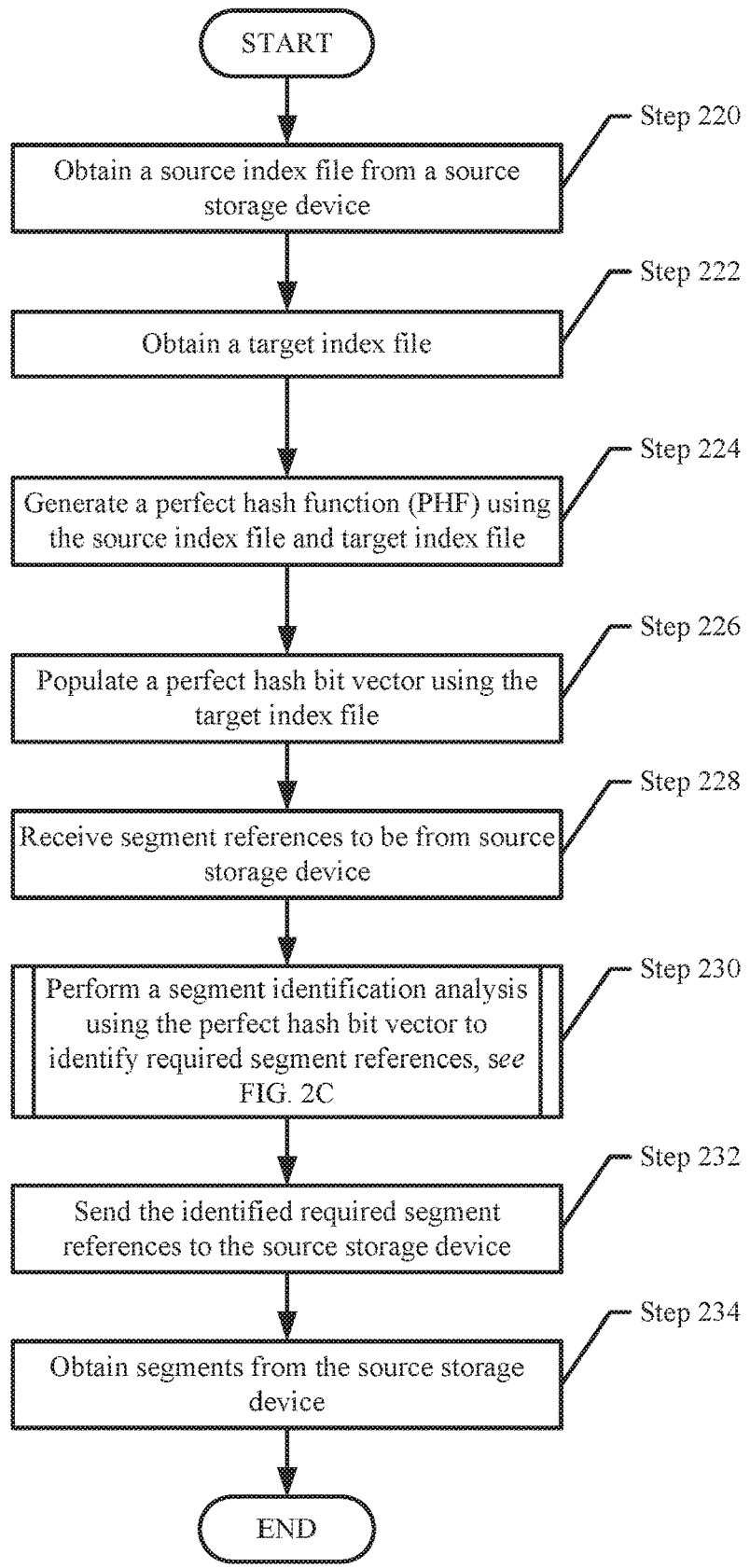
FIG. 2B shows a flowchart for determining segments to be transferred from the source storage device to the target storage device in accordance with one or more embodiments of the invention.

FIG. 2B shows a flowchart for determining segments to be transferred from the source storage device to the target storage device in accordance with one or more embodiments of the invention. The method shown in FIG. 2B may be performed by, e.g., a target storage device (150, FIG. 1A). Other components of the system illustrated in FIG. 1A may perform the methods of FIG. 2B without departing from the invention.

In one or more embodiments of the invention, the method of FIG. 2B is performed following Step 206 of FIG. 2A.

In Step 220, a source index file is obtained from a source storage device. In Step 222, a target index file is obtained.

In one embodiment of the invention, the source index file and the target index file are stored in the memory (as opposed to the persistent storage) of the target storage device. The source index file is generated by obtaining a snapshot of the source storage system and then storing the references (i.e., the references that directly reference segments) into an in-memory file (i.e., the source index file) on the source storage system. Similarly, the target index file is generated by obtaining a snapshot of the target storage system and then storing the references (i.e., the references that directly reference segments) into an in-memory file (i.e., the target index file) on the target storage system.

Continuing with the discussion of FIG. 2B, in Step 224, a perfect hash function (PHF) is generated using the source index file and the target index file. In one or more embodiments of the invention, the source index file and the target index file are combined to obtain a combined index. The duplicate segment references in the combined index are removed to generate an updated combined index. Said another way, the updated combined index is the union of the source index file and the target index file.

The PHF is generated by analyzing the references in the updated combined index and generating a hash function (referred to as a PHF), which uniquely maps each reference in the updated combined index to a unique hash value. The PHF, which is unique to the updated combined index, may be generated using any known or later discovered method or technique. Each unique hash value is then mapped to a unique location in a bit vector referred to as a perfect hash bit vector (PHV). Said another way, the PHF provides a collision free mapping from keys to distinct integers, and the PHV is a vector where the perfect hash function maps each key to a unique bit vector position. The number of bits in PHV may correspond to at least the number of unique hash values generated by the segment references in the updated combined index.

In Step 226, the perfect hash bit vector (PHV) is populated using the target index file and the PHF. The PHV may be an array of bits (e.g., 1 or 0). Each bit may correspond to a segment stored in the source storage device and/or the target storage device. All bits in the PHV may be initially set to 0 (or alternatively 1). In order to populate the PHV, the PHF is applied to a segment reference in the target index file in order to generate a hash value. The hash value is then used to identify a bit in the PHV. The identified bit is then set to 1 (or 0 if the PHV was initialized by setting each bit to 1). This process is repeated for each segment reference in the target index file. The result of this processing is a populated PHV, which specifies the file segments that are stored on the target storage device. In one embodiment of the invention, the populated PHV is stored in the memory (as opposed to the persistent storage) of the target storage device.

In Step 228, segment references (also referred to as "received segment references") corresponding to the segments to be transferred are received from the source storage device. The segment references may correspond to data that the source storage device requests to be transferred to the target storage device. In one or more embodiments of the invention, the segment references are received after Step 210 of FIG. 2A.

In Step 230, a segment identification analysis is performed using the PHF, the populated PHV, and the received segment references in order to determine which of the received segment references are not already on the target storage device. After the processing step 230, the resulting set of received segment references is referred to as the required segment references. In one or more embodiments of the invention, the segment identification analysis is performed via the method illustrated in FIG. 2C. The segment identification analysis may be performed using other methods without departing from the invention.

In Step 232, the required segment references are sent to the source storage device.

In Step 234, segments are obtained from the source storage device, which correspond to the required segment references. The segments may be stored in the persistent storage of the target storage device. In one or more embodiments of the invention, the segments are stored in target container(s).

Figure 2C:
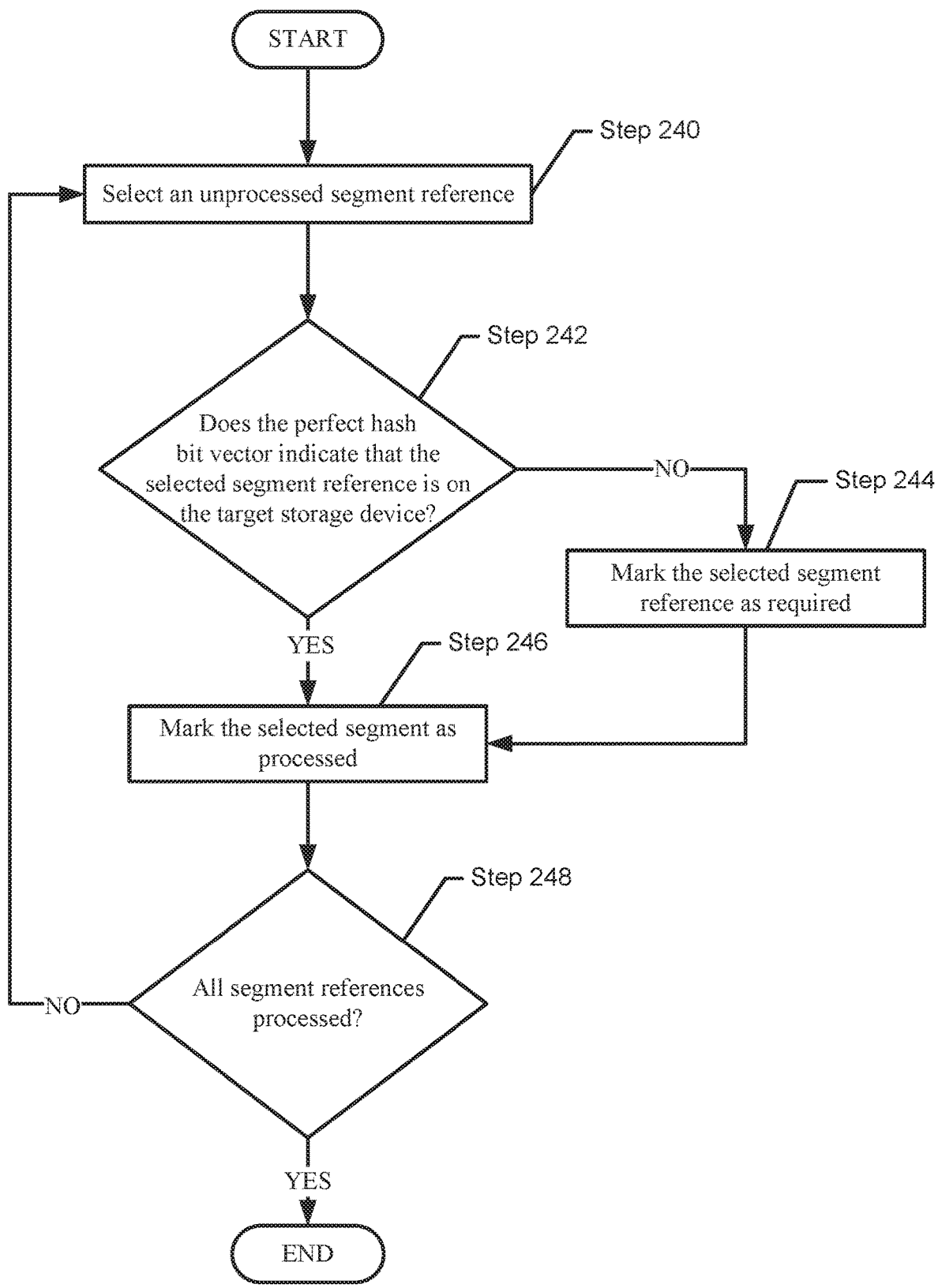
FIG. 2C shows a flowchart for performing a segment identification analysis in accordance with one or more embodiments of the invention.

FIG. 2C shows a flowchart for performing a segment identification analysis in accordance with one or more embodiments of the invention. The method shown in FIG. 2C may be performed by, e.g., a target storage device (150, FIG. 1A). Other components of the system illustrated in FIG. 1A may perform the method of FIG. 2C without departing from the invention.

In Step 240, an unprocessed segment reference (i.e., a received segment reference) is selected.

In Step 242, a determination is made about whether the PHV indicates that the segment reference is on the target storage device. If the perfect hash bit vector indicates that the segment reference is on the target storage device, the method may proceed to Step 246; otherwise, the method may proceed to Step 244. In one embodiment of the invention, the determination in step 242 includes: (i) applying the PHF to the segment reference to obtain a hash value; (ii) identifying a location in the PHV using the hash value; (iii) determining whether the bit value in the identified location is 1 (or 0 if 0 indicates that the segment is present on the target storage device); and (iv) if the value is 1 (or 0 if 0 indicates that the segment is present on the target storage device) then the segment corresponding to the segment reference is already present on the target storage device and, as such, does not need to be transferred from the source storage device (i.e., proceed to step 246); however, if the value is 0 (or 1 if 1 indicates that the segment is not present on the target storage device) then the segment corresponding to the segment reference is not present on the target storage device and, as such, needs to be transferred to the target storage device (i.e., proceed to step 244).

In Step 244, the segment reference is marked as required.

In Step 246, the segment reference is marked as processed.

In Step 248, a determination is made about whether all segment references are processed. If all segment references are processed, the method may end following Step 248; otherwise the method may proceed to Step 240.

EXAMPLE

Figure 3A:
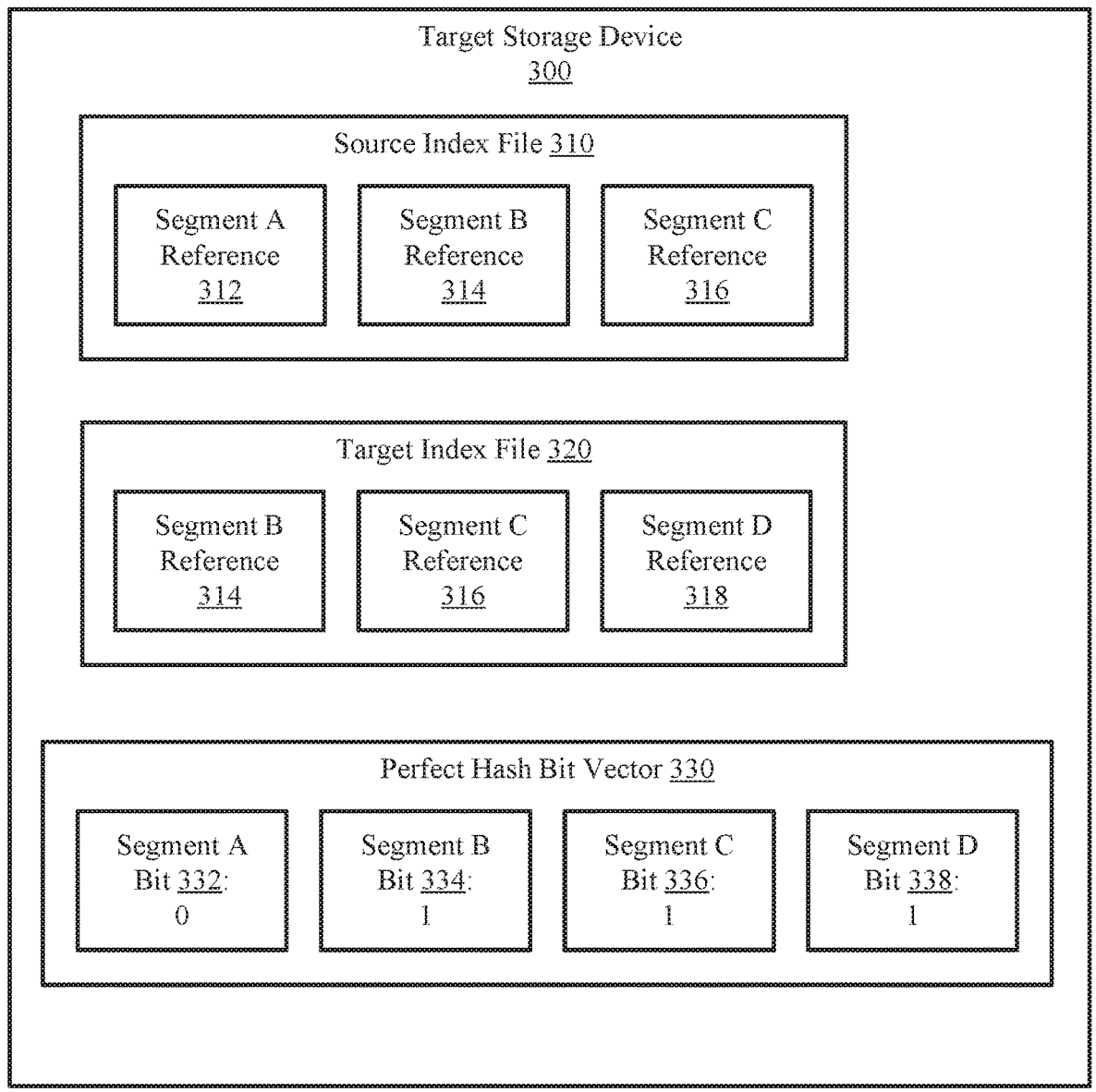
FIGS. 3A-3B show an example in accordance with one or more embodiments of the invention.
Figure 3B:
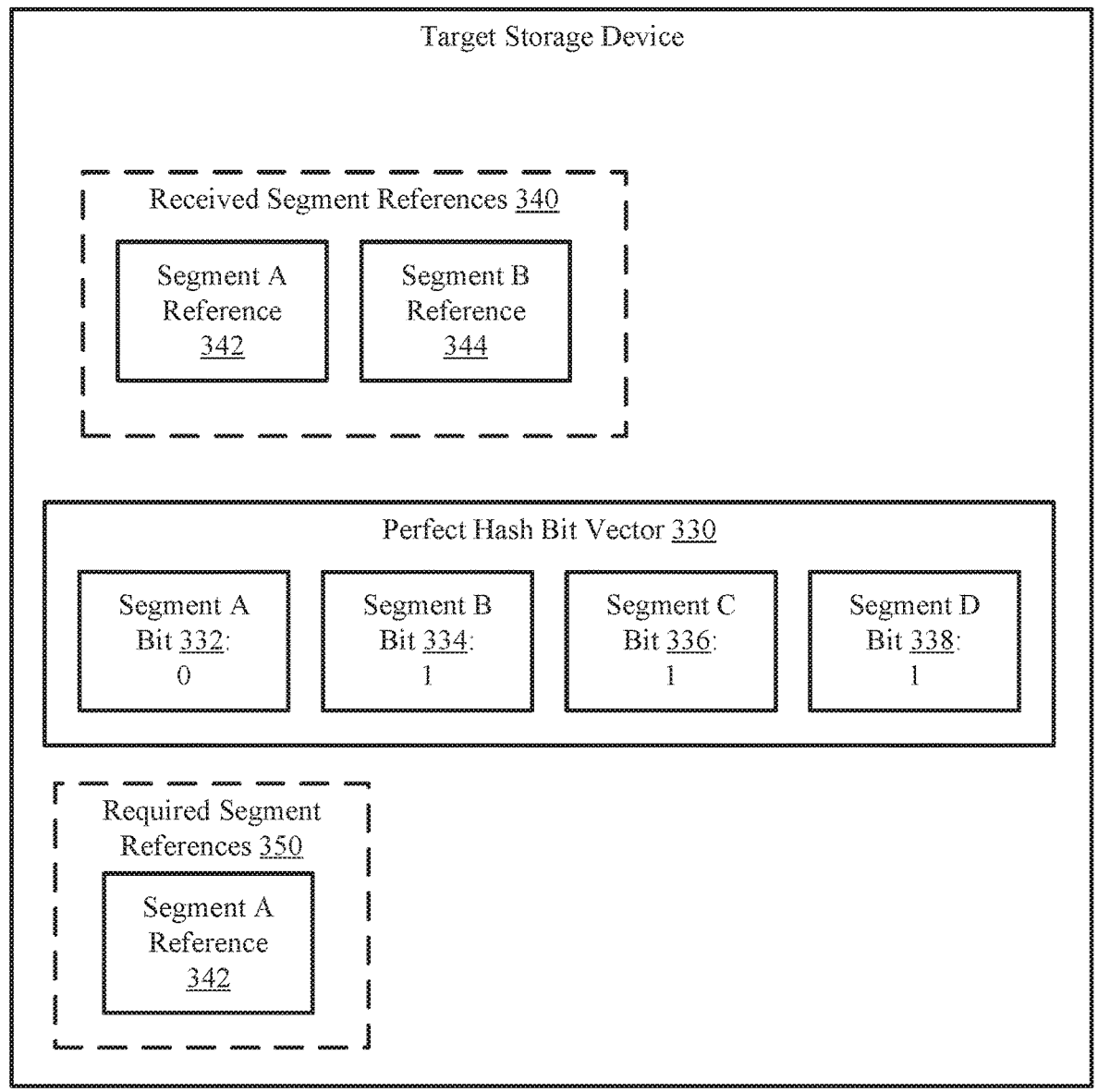

The following section describes an example. The example is not intended to limit the invention. Turning to the example, consider a scenario in which a source storage device initiates the transferred of files to a target storage device. In response to the initiation, the source storage device generates and sends a source index file to the target storage system. As shown in FIG. 3A, the target storage system (300) receives the source index file (310). The source index file (310) includes segment references A, B, and C (312, 314, 316) corresponding to segments stored in the source storage device.

The target storage device (300), in response to obtaining the source index file (310), may perform the methods of FIGS. 2B-2C to generate a PHF using the source index file (310) and a target index file (320), which stores segment references B, C, D (314, 316, 318) corresponding to segments stored in the target storage device (300). The PHF and the target index file are then used to generate a populated perfect hash bit vector (PHV) (330). The PHV (330) includes four bits—Segment A Bit, (332), Segment B Bit (334), Segment C Bit (336), Segment D Bit (338), where each of the aforementioned bits corresponds to a unique segment reference from the union of the source index file and the target index file.

In this example, the perfect hash bit vector (330) may be populated by setting bits (334, 336, 338) corresponding to Segment B, Segment C, and Segment D. In this manner, the populated PHV (330) specifies the segments that are stored in the target storage device.

Continuing the methods of FIG. 2A-2C, the target storage device (300) may obtain received segment references (342, 344) corresponding to the segments to be stored in the target storage device (300) from the source storage device. The target storage device (300) may process each received segment reference (342, 344) by mapping the segment reference (342, 344) to a bit (332, 334, 336, 338) in the PHV (330) using the PHF.

More specifically, segment reference A (342) is be mapped to segment A bit (332). This bit (332), set to 0, indicates that segment A is not stored in the target storage device (300). Accordingly, segment reference A (342) may be marked as a required segment reference. Segment reference B (344) is mapped to segment B bit (334). This bit (334), set to 1, indicates that segment B is stored in the target storage device (300) and, as such, segment reference B is not marked as a required segment reference. As a result of this processing, segment reference A (342) is the only required segment reference (360).

Following the processing of the received segment references (340), the target storage device (300) may send the required segment references (350) to the source storage device. The source storage device, in response to obtaining the required segment references (350), sends data corresponding to the required segment references (350), which in this example is segment A. The target storage device (300) may store segment A after obtaining it from the source storage device.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of storing data from a first computing device to a second computing device by modifying a method for determining whether portions of the data are present in the second computing device prior to sending the data. The method may map references, of any size, that specify portions of the data to single-bit elements in a vector. Embodiments of the invention may minimize data lookup by processing the single-bit elements when determining whether the portions of data are stored in the second computing device.

Thus, embodiments of the invention may address the problem of inefficient use of computing resources that implement deduplication to store data in a distributed computing environment. This problem arises due to the technological nature of the environment in which backup services are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for transferring data, comprising:
   receiving a source index file from a source storage device,
      wherein the source index file comprises a first plurality of segment references, and
      wherein each of the first plurality of segment references corresponds to a segment stored on the source storage device;
   generating a perfect hash function (PHF) using the source index file and a target index file,
      wherein the target index file comprises a second plurality of segment references,
      wherein each of the second plurality of segment references corresponds to a segment stored on a target storage device, and
      wherein the generating the PHF comprises obtaining a union of the first plurality of segment references and the second plurality of segment references;
   populating a perfect hash bit vector (PHV) using the PHF and the target index file to obtain a populated PHV;
   determining required segment references using the populated PHV and received segment references;
   providing the required segment references to a source storage device; and
   receiving segments corresponding to the required segment references from the source storage device.

2. The method of claim 1, wherein the populated PHV, the source index file and the target index file are stored in-memory on the target storage device.

3. The method of claim 1, further comprising:
   receiving the received segment references from the source storage device.

4. The method of claim 1, wherein determining the required segment references using the populated PHV and the received segment references comprises:
   selecting a received segment reference of the received segment references;
   generating, using the PHF, a hash value for the received segment reference;
   identifying a location in the populated PHV using the hash value;
   making a determining that a bit value in the location is set;
   based on the determination, marking the received segment reference as a required segment reference.

5. The method of claim 1, wherein populating a perfect hash bit vector (PHV) using the perfect hash function (PHF) and the target index file to obtain the populated PHV comprises:
   selecting a segment reference in the target index file;
   generating, using the PHF, a hash value for the segment reference;
   identifying a location in the populated PHV using the hash value;
   setting a bit value in the location.

6. A system, comprising:
   a processor;
   memory comprising a populated perfect hash bit vector (PHV) and instructions, which when executed by the processor perform a method, the method comprising:
      receiving a source index file from a source storage device,
         wherein the source index file comprises a first plurality of segment references, and
         wherein each of the first plurality of segment references corresponds to a segment stored on the source storage device;
      generating a perfect hash function (PHF) using the source index file and a target index file,
         wherein the target index file comprises a second plurality of segment references,
         wherein each of the second plurality of segment references corresponds to a segment stored on a target storage device, and
         wherein the generating the PHF comprises obtaining a union of the first plurality of segment references and the second plurality of segment references;
      populating a perfect hash bit vector (PHV) using the PHF and the target index file to obtain a populated PHV;
      determining required segment references using the populated PHV and received segment references;
      providing the required segment references to a source storage device; and
      receiving segments corresponding to the required segment references from the source storage device.

7. The system of claim 6, wherein the populated PHV, the source index file and the target index file are stored in-memory on the target storage device.

8. The system of claim 6, the method further comprising:
   receiving the received segment references from the source storage device.

9. The system of claim 6, wherein determining the required segment references using the populated PHV and the received segment references comprises:
   selecting a received segment reference of the received segment references;
   generating, using the PHF, a hash value for the received segment reference;
   identifying a location in the populated PHV using the hash value;
   making a determining that a bit value in the location is set;
   based on the determination, marking the received segment reference as a required segment reference.

10. A non-transitory computer readable medium comprising computer readable program code, which when executed by a computer processor enables the computer processor to perform a method, the method comprising:
    receiving a source index file from a source storage device,
       wherein the source index file comprises a first plurality of segment references, and
       wherein each of the first plurality of segment references corresponds to a segment stored on the source storage device;
    generating a perfect hash function (PHF) using the source index file and a target index file,
       wherein the target index file comprises a second plurality of segment references,
       wherein each of the second plurality of segment references corresponds to a segment stored on a target storage device, and
       wherein the generating the PHF comprises obtaining a union of the first plurality of segment references and the second plurality of segment references;
    populating a perfect hash bit vector (PHV) using the PHF and the target index file to obtain a populated PHV;
    determining required segment references using the populated PHV and received segment references;
    providing the required segment references to a source storage device; and
    receiving segments corresponding to the required segment references from the source storage device.

11. The non-transitory computer readable medium of claim 10, wherein the populated PHV, the source index file and the target index file are stored in-memory on the target storage device.

12. The non-transitory computer readable medium of claim 10, the method further comprising:
   receiving the received segment references from the source storage device.

13. The non-transitory computer readable medium of claim 10, wherein determining required segment references using the populated PHV and received segment references comprises:
   selecting a received segment reference of the received segment references;
   generating, using the PHF, a hash value for the received segment reference;
   identifying a location in the populated PHV using the hash value;
   making a determining that a bit value in the location is set;
   based on the determination, marking the received segment reference as a required segment reference.

14. The non-transitory computer readable medium of claim 10, wherein populating a perfect hash bit vector (PHV) using the perfect hash function (PHF) and the target index file to obtain the populated PHV comprises:
   selecting a segment reference in the target index file;
   generating, using the PHF, a hash value for the segment reference;
   identifying a location in the populated PHV using the hash value;
   setting a bit value in the location.

* * * * *